United States Patent
Pawa

(10) Patent No.: US 6,449,044 B1
(45) Date of Patent: Sep. 10, 2002

(54) METHOD FOR CHECKING CAM LOBE ANGLES

(75) Inventor: Kharati Pawa, Saginaw, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 09/922,100

(22) Filed: Aug. 6, 2001

(51) Int. Cl.[7] .................................................. G01B 9/08
(52) U.S. Cl. ................ 356/394; 123/90.15; 123/406.58; 324/207.2
(58) Field of Search ............................. 356/614, 601, 356/388, 394, 397, 398; 423/90.15, 90.16, 90.17, 90.18, 90.45, 406.5, 406.58, 609; 324/15–18, 207.2

(56) References Cited

U.S. PATENT DOCUMENTS

| | | | |
|---|---|---|---|
| 3,694,733 A | * 9/1972 | Cantonwine | 324/15 |
| 3,831,272 A | * 8/1974 | Purdy | 29/630 |
| 4,966,107 A | * 10/1990 | Imajo | 123/90.45 |
| 6,050,242 A | * 4/2000 | Wilkinson | 123/406.58 |
| 6,100,540 A | 8/2000 | Ducharme et al. | 280/559.38 |
| 6,108,076 A | 8/2000 | Hanseder | 356/141.1 |
| 6,128,083 A | 10/2000 | Nogami | 356/358 |
| 6,209,216 B1 | 4/2001 | Bear | 33/530 |
| 6,216,655 B1 | * 4/2001 | Yoshiki et al. | 123/90.15 |

FOREIGN PATENT DOCUMENTS

| | | | |
|---|---|---|---|
| GB | 2 058 344 | * | 4/1981 |
| JP | 11 062 640 | * | 3/1999 |

* cited by examiner

*Primary Examiner*—Frank G. Font
*Assistant Examiner*—Sang H. Nguyen
(74) *Attorney, Agent, or Firm*—Leslie C. Hodges

(57) ABSTRACT

An apparatus and method for verifying the lobe angle of cams on a camshaft. Laser beams directed on cam lobe surfaces and a timing indicator during camshaft rotation are reflected to receiving elements that provide distance data to a computer also fed with encoded information on the angular positions of the camshaft lobes. The computer calculates the relative angles of the cam lobes which are compared to a standard stored in the computer to qualify the camshaft and verify the operation of the assembly process.

3 Claims, 2 Drawing Sheets

METHOD FOR CHECKING CAM LOBE ANGLES

TECHNICAL FIELD

This invention relates to engine camshafts including assembled camshafts and, more particularly, to an apparatus and method for checking the phase angle location of the cam lobes of a camshaft relative to a timing indicator on the camshaft.

BACKGROUND OF THE INVENTION

It is known in the art of camshaft manufacture to form a camshaft by assembly of a plurality of cam lobes and bearing members onto a hollow tube and fixing the components in place by any one of various assembly processes. In one example, the cams and bearings are placed in a fixture which holds these components in predetermined angular relationships, a tubular shaft is inserted through aligned central openings in the cam and bearing components and the tube is expanded into engagement with the openings by forcing a steel ball through the tubular interior of the tube.

Because of the possibility that one or more of the lobes may be accidentally mispositioned or mislocated in the fixture, or the fixture itself may become worn excessively, it is desirable to maintain close inspection of the camshafts soon after the assembly process so that any fault in the process will be discovered before a number of unusable camshafts are manufactured. It has been a problem, however, to find a practical method of inspecting the camshafts which is easy to operate, can be accomplished soon after the assembly step and provides an accurate indication of the relative phase angles of the cams so that an operator is advised soon if any malfunction of the assembly process has occurred.

SUMMARY OF THE INVENTION

The present invention provides an apparatus and method which may be utilized by an operator for automatically verifying the lobe angle of a cam relative to the location of a timing notch on a camshaft. Each camshaft is picked up from a conveyor after assembly, held between centers and rotated. A plurality of lasers is provided, one for each cam lobe and one for the timing notch. The lasers are aligned with their associated lobes and timing notch and project a laser beam of light on each lobe and the notch. The light from these elements is focused, through one or more lenses, against a receiver in each laser unit which determines, by the position of the focused light, the distance of the lobe and notch surfaces at prescribed intervals from the receiver element.

The distance measurements are fed into a computer along with encoded information on the angular positions of the lobes as the camshaft is rotated, and the information is evaluated in a program which determines the relative angles of all the lobes to the timing notch. The readings are then internally compared to a reference lobe and the computer determines the accuracy of location of the other lobes relative to the reference lobe and the timing notch relative to the reference lobe. Parts with any deviation from the allowable tolerance are rejected and a warning is given to the operator to correct the process if required. The laser measurement process is more accurate and reliable than other forms of measurement and it does not rely on contact with the lobes so down time due to wear or damage to probes is avoided.

These and other features and advantages of the invention will be more fully understood from the following description of certain specific embodiments of the invention taken together with the accompanying drawings.

DESCRIPTION OF THE PREFERRED EMBODIMENT

Figure 1:
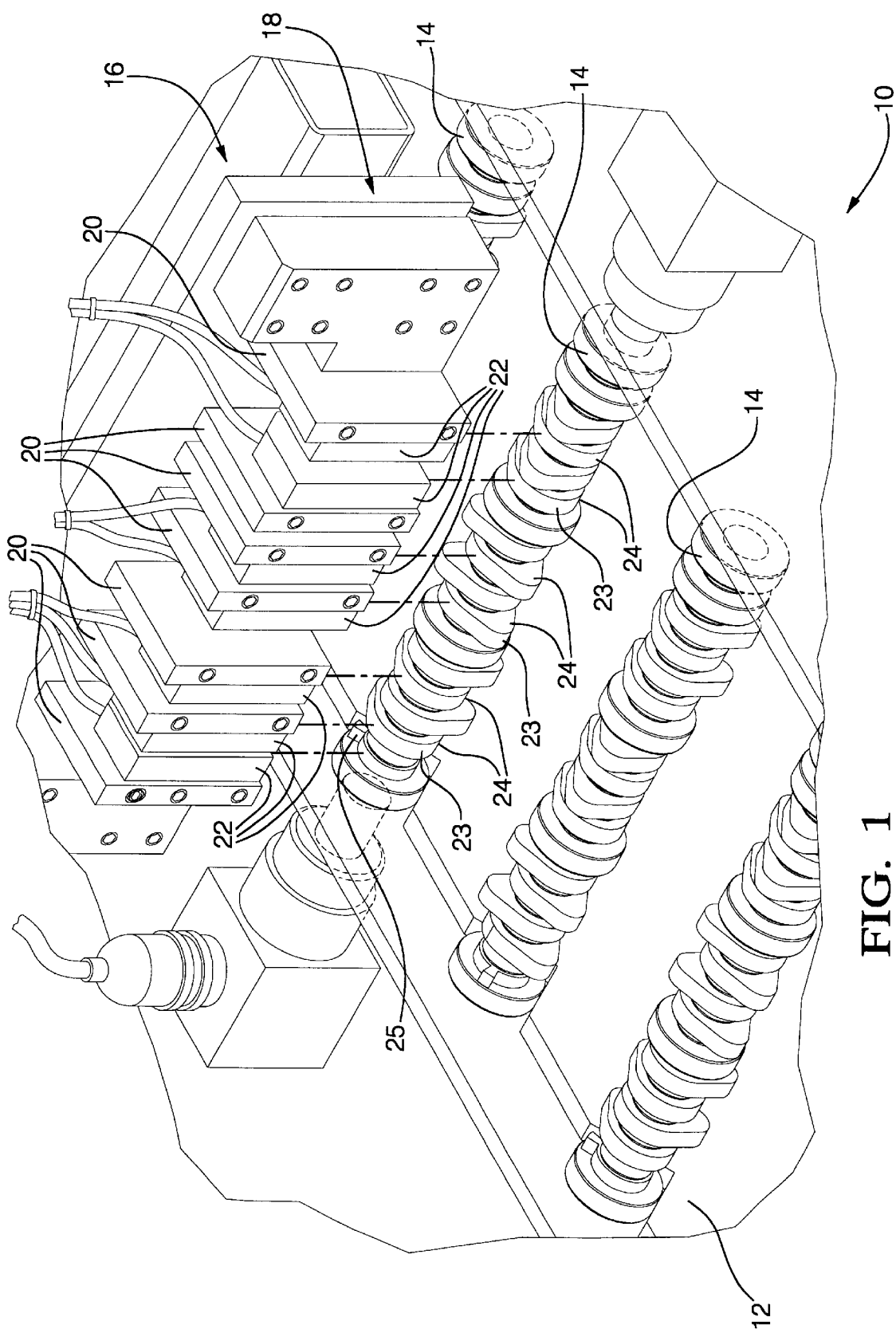
FIG. 1 is a pictorial view showing pertinent portions of an apparatus in accordance with the invention for use for checking the phase angles of cam lobes on an assembled camshaft.

Referring first to FIG. 1 of the drawings, numeral 10 generally indicates a cam checking station including a conveyor 12 on which a plurality of assembled camshafts 14 are carried for checking and subsequent operations after a camshaft assembly process. The checking station 10 includes a checking apparatus 16 including a frame 18 carrying a plurality of support pads 20 on each of which is mounted a laser 22. Each laser 22 is aligned with a surface 23 of one of the cam lobes 24 of the camshaft to be checked or with the timing indicator or notch 25 at one end of the camshaft 14.

Figure 2:
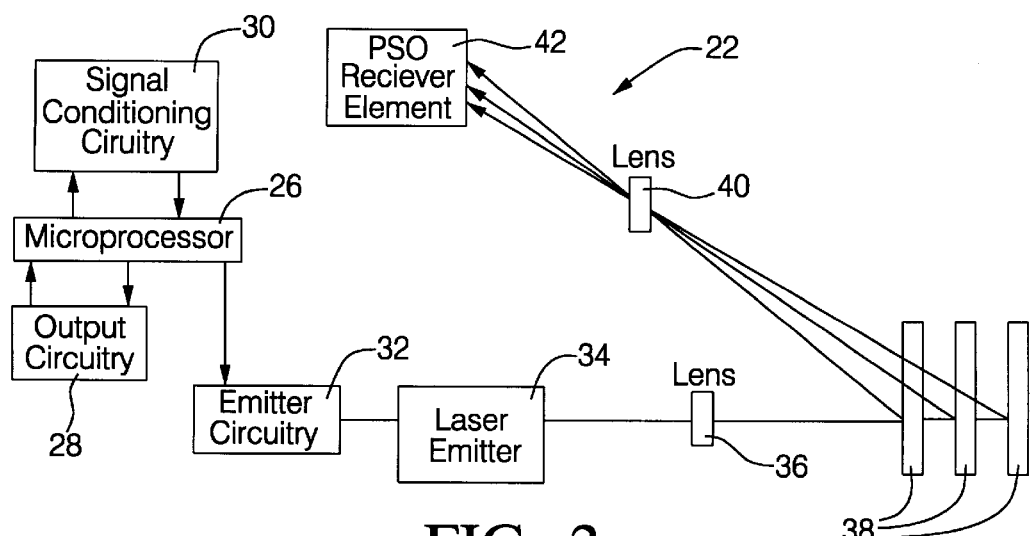
FIG. 2 is a schematic diagram illustrating the equipment and known process used by the lasers for measuring the distance of the cam surfaces and timing notch from a laser emitter.

Referring now to FIG. 2, there is shown schematically additional equipment, not shown in FIG. 1, which is provided at the checking station in connection with the lasers 22. A microprocessor 26 operates together with output circuitry 28 and signal conditioning circuitry 30 to feed emitter circuitry 32 that controls the timing of laser beams projected from an emitter 34. Each of the laser beams is projected through a lens 36 against a lobe surface 23 of one of the camshaft lobes 24, or the timing indicator 25, as the camshaft 14 is rotating. In FIG. 2, various positions of the lobe surfaces 23 are indicated by numerals 38. The laser light illuminating the lobe and timing indicator surfaces is focused through a receiving lens 40 onto receiver elements 42. The receiver elements 42 are placed so that the distances of the various lobe surface positions 38 from the emitter 34 are indicated by the position of the focused light falling on the receiver elements 42.

Figure 3:
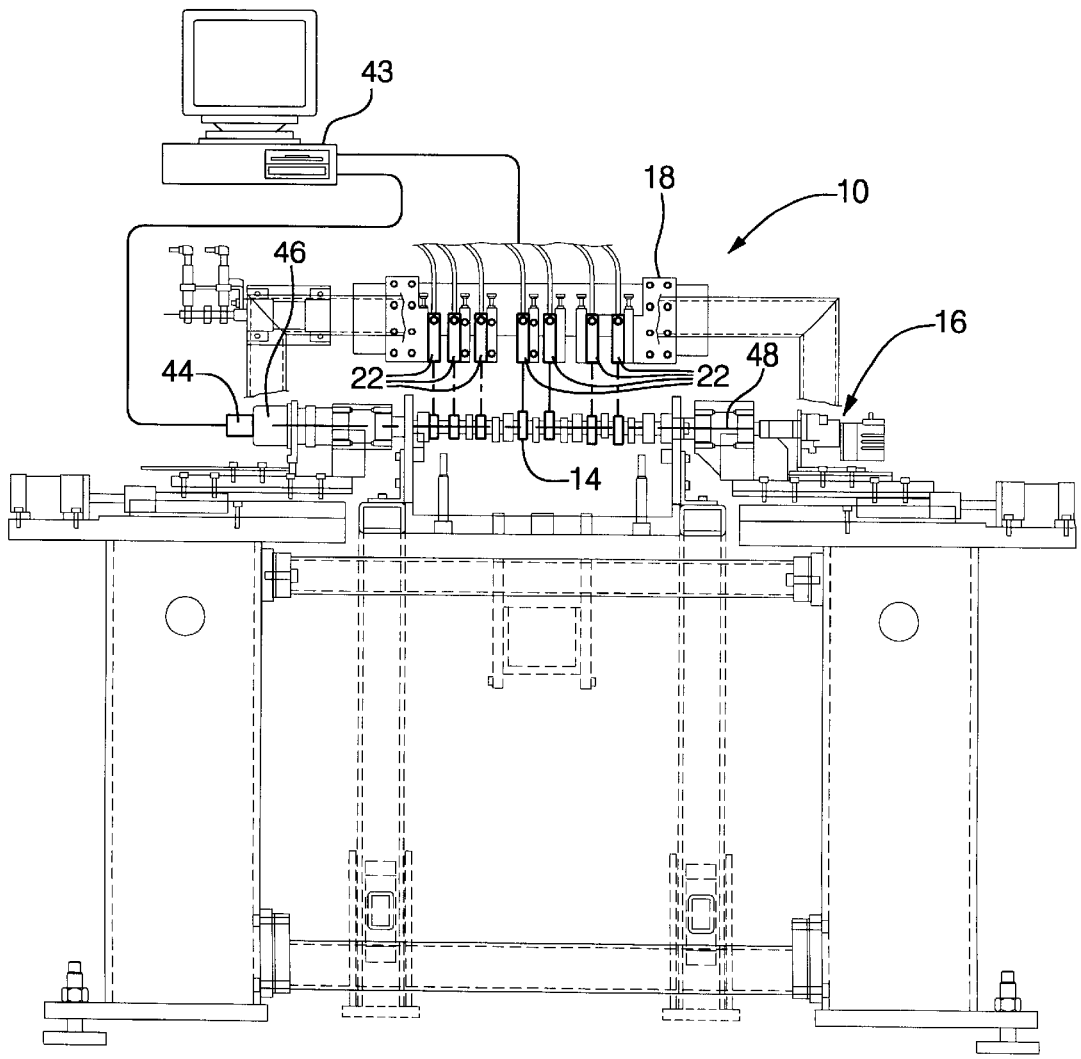
FIG. 3 is a schematic diagram illustrating the arrangement and operation of the cam checking apparatus.

Referring now to FIG. 3, the receiver elements 42 generate signals indicating the laser-defined distances of the measured surfaces and send the operational data to a computer 43. The computer also receives signals from an encoder 44 mounted on or connected with a motor 46, which rotatably drives the camshaft 14 on centers about a fixed axis 48. The encoder information indicating the angular displacement of the camshaft 14 is combined with the laser information indicating the distance of the cam and notch surfaces from their respective laser emitters 34 and is used to calculate and display on the computer the actual deviation of each of the cam lobes from desired target values. The displacement may be displayed as a graph whereon its values are compared to a reference lobe graph, and the software may be programmed to give an audible signal to an operator when any of the cam lobes are displaced from their intended angular position by a deviation beyond the allowable tolerance. An indication that the part is rejected may also be provided.

While the invention has been described by reference to certain preferred embodiments, it should be understood that numerous changes could be made within the spirit and scope of the inventive concepts described. Accordingly, it is intended that the invention not be limited to the disclosed embodiments, but that it have the full scope permitted by the language of the following claims.

What is claimed is:

1. A method for checking phase angles of cam lobes on an assembled camshaft relative to a cam timing indicator, the method comprising:

rotating the camshaft about an axis while sending drive position signals to an associated computer;

simultaneously illuminating with laser beams the timing indicator and a surface of each of the lobes to be checked and reflecting focused laser light from the laser beams against receivers indicating distances of the illuminated timing indicator and cam lobe surfaces from the receivers; and comparing the indicated positions of the timing indicator and at least one of the cam lobe surfaces with equivalent data stored in the computer from a standard camshaft and computing the deviation of all the lobes of the checked camshaft from the lobes of the standard camshaft.

2. A method as in claim 1 including:

rejecting any camshaft having excessive deviation of a cam lobe position from the standard and advising the operator that correction of the assembly process is required.

3. A method as in claim 1 wherein:

the positions of a reference lobe, the other lobes and the timing indicator are first indicated by the output of the lasers; and the relative positions of the other lobes and the timing indicator to the reference lobe are then computed to establish the deviations of all the cam lobes and the timing indicator from the reference lobe.

* * * * *